(12) United States Patent
Shizuku et al.

(10) Patent No.: US 9,882,225 B2
(45) Date of Patent: Jan. 30, 2018

(54) CURRENT COLLECTOR FOR FUEL CELL, FUEL CELL STACK, FUEL CELL SYSTEM, AND METHOD OF MANUFACTURING FUEL CELL SYSTEM

(71) Applicant: TOYOTA JIDOSHA KABUSHIKI KAISHA, Toyota-shi, Aichi-ken (JP)

(72) Inventors: Fumishige Shizuku, Seto (JP); Hideaki Tanaka, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 197 days.

(21) Appl. No.: 14/878,340

(22) Filed: Oct. 8, 2015

(65) Prior Publication Data
US 2016/0111733 A1   Apr. 21, 2016

(30) Foreign Application Priority Data

Oct. 15, 2014 (JP) .................................. 2014-210560

(51) Int. Cl.
*H01M 8/02* (2016.01)
*H01M 8/24* (2016.01)
(Continued)

(52) U.S. Cl.
CPC ....... *H01M 8/0247* (2013.01); *H01M 8/2465* (2013.01); *Y02P 70/56* (2015.11)

(58) Field of Classification Search
None
See application file for complete search history.

(56) References Cited

U.S. PATENT DOCUMENTS

| 7,132,189 B2 * | 11/2006 | Inai ................... | H01M 8/04089 |
| | | | 429/450 |
| 2008/0182151 A1* | 7/2008 | Mizusaki ............ | H01M 8/0247 |
| | | | 429/457 |
| 2011/0008984 A1* | 1/2011 | Andreas-Schott .. | H01M 8/0247 |
| | | | 439/251 |

FOREIGN PATENT DOCUMENTS

| JP | S61-193376 A | 8/1986 |
| JP | H09-213303 A | 8/1997 |

(Continued)

*Primary Examiner* — Jonathan Crepeau
(74) *Attorney, Agent, or Firm* — Finnegan, Henderson, Farabow, Garrett & Dunner LLP (57) ABSTRACT

In order to suppress an increase in electric resistance when retrieving electric power collected from a fuel cell stack, a current collector for a fuel cell is provided. The current collector includes a current collecting portion for collecting electric power generated by the fuel cell, and a terminal portion for outputting the power collected by the current collecting portion. A bus bar is attached to the terminal portion. The terminal portion includes a terminal portion main body, electrically connected with the current collecting portion, a first threaded part fixed to the terminal portion main body, a second threaded part for threadedly engaging with the first threaded part to fix one end of the bus bar to the terminal portion, and a protruded portion provided in the same surface as a surface where the first threaded part of the terminal portion main body is provided. The protruded portion is disposed at a position where the protruded portion contacts the bus bar to stop a rotation of the terminal portion main body accompanying fastening of the second threaded part, when the one end of the bus bar is fixed to the terminal portion in a state where the other end of the bus bar is fixed to another instrument.

8 Claims, 10 Drawing Sheets

(51) Int. Cl.
*H01M 8/0247* (2016.01)
*H01M 8/2465* (2016.01)

(56) References Cited

FOREIGN PATENT DOCUMENTS

JP        2011-228192        11/2011
WO     WO 2008/55356     *   5/2008

* cited by examiner

CURRENT COLLECTOR FOR FUEL CELL, FUEL CELL STACK, FUEL CELL SYSTEM, AND METHOD OF MANUFACTURING FUEL CELL SYSTEM

CROSS-REFERENCE TO RELATED APPLICATION

This application claims priority based on Japanese Patent Application No. 2014-210560, filed on Oct. 15, 2014, the contents of all of which are incorporated herein by reference in their entirety.

BACKGROUND

Field

The present invention relates to a fuel cell.

Related Art

A fuel cell stack comprised of a plurality of stacked fuel cells (hereinafter, each fuel cell may also be referred to as a "unit cell") has current collectors for collecting electric power generated in each unit cell and supplying the power to outside. JP2011-228192A discloses that the current collectors are provided with current collecting portions for collecting the power generated in the unit cells, and terminal portions for outputting the collected power.

Upon the output of the power generated in the fuel cell stack, wiring such as bus bars are connected with the terminal portions of the current collectors, and instruments such as a relay are connected with the terminal portions, for example, via the bus bars. When connecting the bus bar etc. to each terminal portion of the current collector, they are often fastened with threadedly-engaging members, such as a bolt and a nut. If an excessive torque accompanying the fastening of the threadedly-engaging members acts on the terminal portion of the current collector, a contacting surface of the terminal portion with the bus bar may be deformed. Thus, due to the poor contact between the terminal portion and the bus bar, electric resistance increases, and thereby the power collected from the fuel cell stack may not be efficiently retrieved.

SUMMARY

The present invention is made in order to solve at least a part of the subject described above, and can be implemented in terms of the following aspects.

According to one aspect of the invention, a current collector used for a fuel cell is provided. The current collector includes a current collecting portion configured to collecting electric power generated by the fuel cell, and a terminal portion for outputting the power collected by the current collecting portion. A bus bar is attached to the terminal portion. The terminal portion includes a terminal portion main body, electrically connected with the current collecting portion, a first threaded part fixed to the terminal portion main body, a second threaded part for threadedly engaging with the first threaded part to fix one end of the bus bar to the terminal portion, and a protruded portion provided in the same surface as a surface where the first threaded part of the terminal portion main body is provided. The protruded portion is disposed at a position where the protruded portion contacts the bus bar to stop a rotation of the terminal portion main body accompanying fastening of the second threaded part, when the one end of the bus bar is fixed to the terminal portion in a state where the other end of the bus bar is fixed to another instrument. Alternatively, the present invention may also be implemented in terms of the following aspects.

(1) According to one aspect of the invention, a current collector used for a fuel cell is provided. The current collector includes a current collecting portion for collecting electric power generated by the fuel cell, and a terminal portion for outputting the power collected by the current collecting portion. A bus bar is attached to the terminal portion. The terminal portion includes a terminal portion main body, electrically connected with the current collecting portion, a first threaded part fixed to the terminal portion main body, a second threaded part for threadedly engaging with the first threaded part to fix one end of the bus bar to the terminal portion, and a protruded portion provided in the same surface as a surface where the first threaded part of the terminal portion main body is provided. In a state where the one end of the bus bar is fixed to the terminal portion and the other end of the bus bar is fixed to another instrument, the protruded portion is disposed rearward in a rotational direction of the second threaded part with respect to the bus bar when fastening the second threaded part.

According to the current collector of this aspect, the terminal portion is provided with the first threaded part and the protruded portion. Thus, when connecting the bus bar to the terminal portion to output the power generated by the fuel cell stack, the other end of the bus bar is fixed to another instrument, and in this state, the one end of the bus bar is fixed to the terminal portion. Therefore, even if an excessive torque accompanying the fastening of the second threaded part acts on the terminal portion, the protruded portion contacts the fixed bus bar so that a rotation (deformation) of the terminal portion main body is reduced. As the result, an increase in electric resistance due to a poor contact between the terminal portion and the bus bar can be suppressed, thereby suppressing a reduction in retrieving efficiency of power generated by the fuel cell stack.

(2) In the current collector of the aspect described above, the terminal portion main body includes a tip end side, and the protruded portion may be disposed inward in a longitudinal direction of the bus bar with respect to the center of the first threaded part and on the tip end side of the terminal portion main body, when the one end of the bus bar is fixed to the terminal portion and the other end of the bus bar is fixed to the instrument. Thus, as compared with a case where the protruded portion is disposed outward in the longitudinal direction of the bus bar with respect to the center of the first threaded part, a distance from the center of the first threaded part to the protruded portion can often be increased. As the result, the rotation (deformation) of the terminal portion main body can be more certainly reduced by the protruded portion.

(3) In the current collector of the aspect described above, the current collector may further include a threaded member set having a seat portion, the first threaded part being formed in the seat portion, and an attaching member for attaching the seat portion to the terminal portion main body, the attaching member being the protruded portion. Thus, it is desirable because the deformation of the terminal portion main body can be reduced, compared with a case where the first threaded part is directly fixed to the terminal portion main body by welding etc. Further, since the protruded portion is formed by the attaching member, the number of components can be reduced and the cost can also be reduced, as compared with the case where the protruded portion is separately provided.

(4) According to another aspect of the invention, a fuel cell stack is provided. The fuel cell stack includes a stacked body where a plurality of fuel cells are stacked, and the current collectors described above. According to the fuel cell stack, the terminal portion of the current collector is provided with the first threaded part and the protruded portion. Thus, when connecting the bus bar to the terminal portion and outputting the power generated by the fuel cell stack, the other end of the bus bar is fixed, and in this state, the one end of the bus bar is fixed to the terminal portion. Therefore, the protruded portion contacts the fixed bus bar even if the excessive torque accompanying the fastening of the second threaded part acts on the terminal portion main body, thereby reducing the rotation (deformation) of the terminal portion main body. As a result, the increase in electric resistance due to the poor contact between the terminal portion and the bus bar is suppressed, thereby suppressing the reduction in retrieving efficiency of the power generated by the fuel cell stack.

(5) According to another aspect of the invention, a fuel cell system is provided. The fuel cell system includes the fuel cell stack described above, the bus bars fixed to the current collectors of the fuel cell stack at one end thereof, and the instrument fixed to the other end of the bus bar. According to the fuel cell system, the other end of the bus bar is fixed to the instrument, and the instrument is fixed to a predetermined position. Then, when the one end of the bus bar is fixed to the terminal portion, the protruded portion contacts the fixed bus bar even if the excessive torque accompanying the fastening of the second threaded part acts on the terminal portion main body, thereby reducing the rotation (deformation) of the terminal portion main body. As a result, the increase in electric resistance due to the poor contact between the terminal portion and the bus bar is suppressed, thereby suppressing the reduction in retrieving efficiency of the power generated by the fuel cell stack.

(6) According to another aspect of the invention, a method of manufacturing the fuel cell system is provided. The fuel cell system is the same as the one described above, and the method of manufacturing the fuel cell system includes (A) disposing the fuel cell stack at a predetermined position, (B) fixing the instrument at a predetermined position, (C) fixing the bus bars to the fixed instrument, and (D) fixing the bus bar fixed to the instrument, to the terminal portion of the current collector of the fuel cell stack. Thus, the protruded portion contacts the fixed bus bar even if the excessive torque accompanying the fastening of the second threaded part acts on the terminal portion main body, thereby reducing the rotation (deformation) of the terminal portion main body. As a result, the increase in electric resistance due to the poor contact between the terminal portion and the bus bar is suppressed, thereby suppressing the reduction in retrieving efficiency of the power generated by the fuel cell stack.

Note that the present invention can be implemented in other various forms. For example, the invention may be implemented in a form of a movable body to which the fuel cell system is mounted.

BRIEF DESCRIPTION OF THE DRAWINGS

The present disclosure is illustrated by way of example and not by way of limitation in the figures of the accompanying drawings, in which the like reference numerals indicate like elements and in which.

DESCRIPTION OF THE EMBODIMENTS

A. First Embodiment

A1. Structure of Fuel Cell Stack

Figure 1:
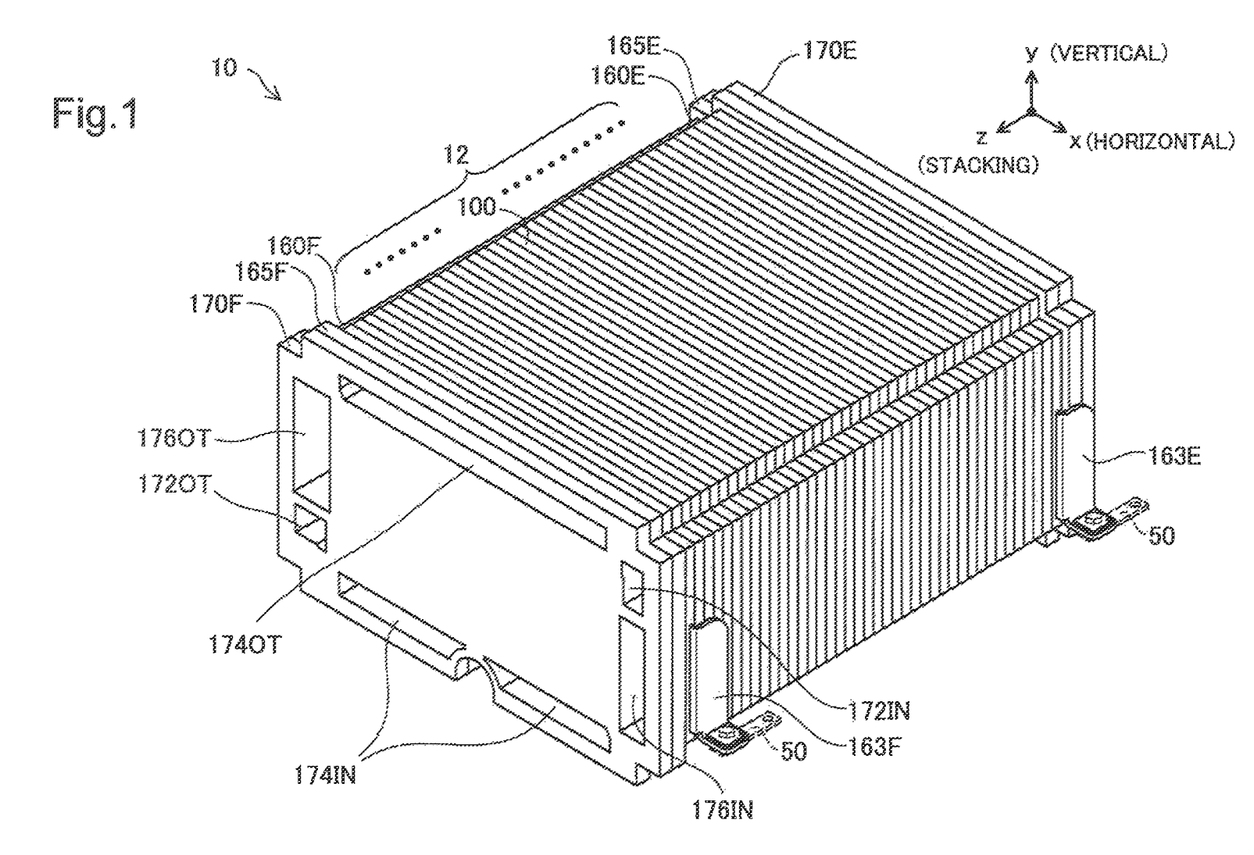
FIG. 1 is a perspective view schematically illustrating a structure of a fuel cell stack as one embodiment of the present invention.

FIG. 1 is a perspective view schematically illustrating a structure of a fuel cell stack as one embodiment of the present invention. The fuel cell stack 10 has a stacked structure in which a plurality of fuel cells 100, each of which functions as a unit cell that generates power, are stacked in z-direction illustrated in FIG. 1 (hereinafter, also referred to as "the stacking direction") to form a stacked body 12, and the stacked body 12 is pinched between end plates 170F and 170E via current collectors 160F and 160E and insulating plates 165F and 165E, respectively. Each of the fuel cells 100, the current collectors 160F and 160E, the insulating plates 165E and 165E, and the end plates 170F and 170E has a plate structure of a substantially rectangular external shape, and is arranged so that a long side thereof is oriented in x-directions in FIG. 1 (horizontal), and a short side is oriented in y-directions in FIG. 1 (perpendicular to the x-directions: vertical). In the following description, positive in the z-directions indicates front or forward, and negative in the z-directions indicates rear or rearward, in FIG. 1. Note that the fuel cell stack 10 in this embodiment is also generally referred to as a "fuel cell," collectively.

Each of the end plate 170F, the insulating plate 165F, and the current collector 160F which are disposed on a front end side have a fuel gas supply hole 172IN and a fuel gas discharge hole 172OT, oxidizing gas supply hole 174IN and oxidizing gas discharge hole 174OT, and cooling water supply hole 176IN and cooling water discharge hole 176OT. Hereinafter, these supply holes and discharge holes are also collectively referred to as "supply and discharge holes." These supply and discharge holes are coupled to respective holes (not illustrated) formed at corresponding positions in each fuel cell 100 to form supply manifolds and discharge manifolds for gas and cooling water. On the other hand, these supply and discharge holes are not formed in the end plate 170E, the insulating plate 165E, and the current collector 160E which are disposed on a rear end side. This is because that the fuel cell is such a type that reactive gas (fuel gas and oxidizing gas) and cooling water are supplied to each fuel cell 100 from the end plate 170F on the front end side via the supply manifolds, and discharging gas and discharging water (cooling water) from each fuel cell 100 are discharged outside from the end plate 170F on the front end side via the discharge manifolds. Note that the fuel cell may also be, but not limited to, other various types, such as a type in which reactive gas and cooling water are supplied from the end plate 170F the front end side, and discharging gas and discharging water (cooling water) are discharged outside from the end plate 170E on the rear end side. In this embodiment, the cooling water is a heat carrier that controls the fuel cells 100 to a target temperature by cooling or heating the fuel cells 100.

Openings of the oxidizing gas supply holes 174IN are elongated in the x-directions (long side directions) in an outer edge portion at a lower end of the end plate 170F on the front end side, and an opening of the oxidizing gas discharge hole 174OT is elongated in the x-directions in an outer edge portion at an upper end. The fuel gas supply hole 172IN is arranged in an upper end portion in the y-directions (short side directions) of an outer edge portion at a right end of the end plate 170F on the front end side in this drawing, and the fuel gas discharge hole 172OT is arranged in a lower end portion in the y-directions of an outer edge portion at a left end in the drawing. An opening of the cooling water supply hole 176IN is elongated in the y-directions below the fuel gas supply hole 172IN, and an opening of the cooling water discharge hole 176OT is elongated in the y-directions above the fuel gas discharge hole 172OT. Note that in the fuel cells 100, each of the supply and discharge holes described above is branched into a plurality of supply and discharge holes as will be described later.

Figure 2:
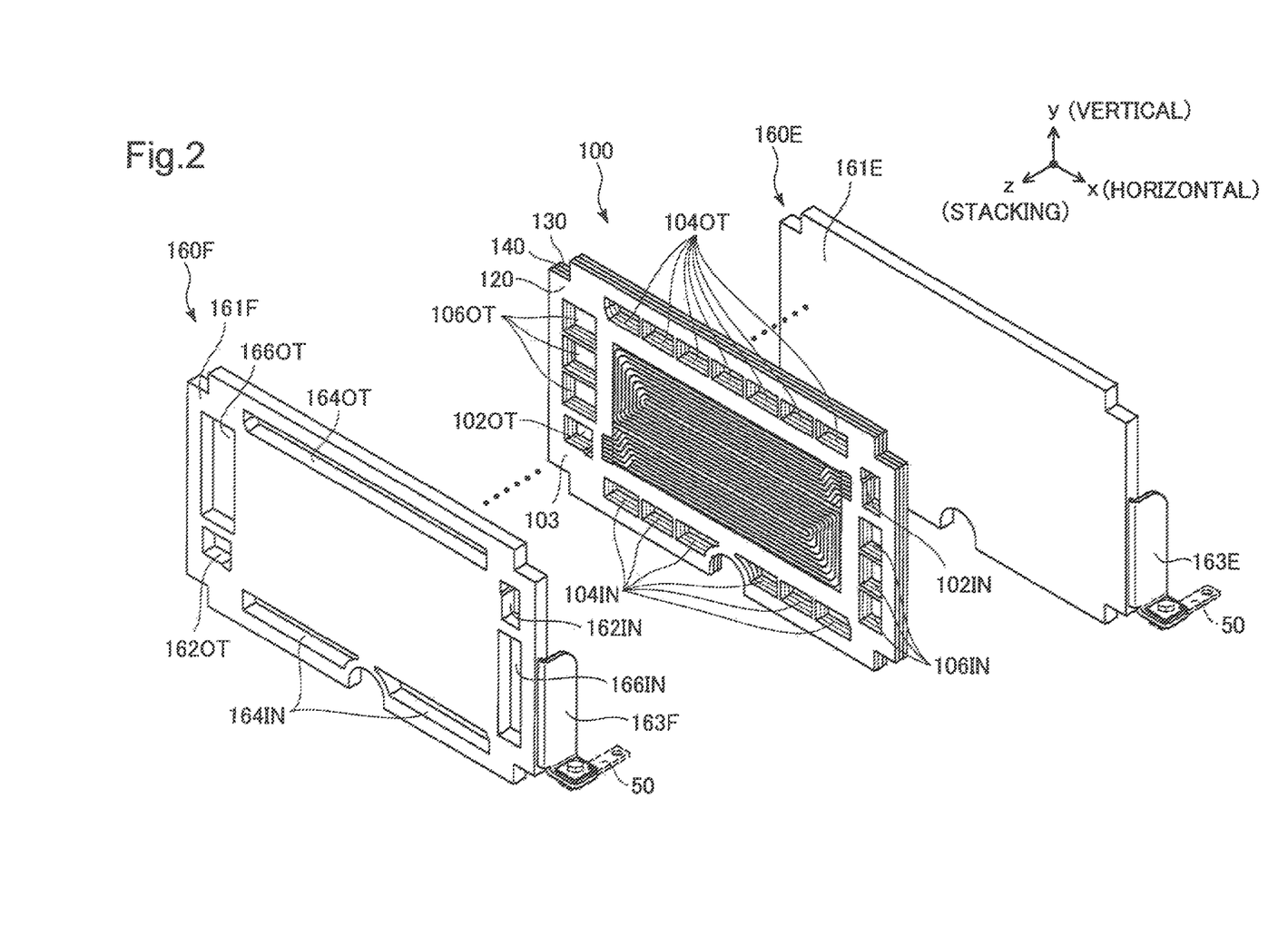
FIG. 2 is a view schematically illustrating a situation of arranging a current collector, fuel cells, and another current collector.

FIG. 2 is a view schematically illustrating a situation of arranging the current collector 160F, the fuel cells 100, and the current collector 160E. The current collector 160F on the front end side and the current collector 160E on the rear end side collect power generated by each fuel cell 100, and output the generated power to outside via terminal portions 163F and 163E. Hereinafter, the current collectors 160F and 160E are collectively referred to as "the current collector 160" unless otherwise they need to be distinguished from each other. A structure of the current collector 160 will be described in detail later.

Each fuel cell 100 includes an anode-side separator 120 made of titanium, a cathode-side separator 130 made of titanium, and a sealing-member-integrated membrane electrode assembly (MEA) 140. Each fuel cell 100 is provided in a peripheral edge portion thereof with a fuel gas supply hole 102IN and a fuel gas discharge hole 102OT, six oxidizing gas supply holes 104IN and seven oxidizing gas discharge holes 104OT, and three cooling water supply holes 106IN and three cooling water discharge holes 106OT. These supply and discharge holes are connected with the fuel gas supply hole 172IN etc. in the end plate 170F. When the plurality of fuel cells 100 are stacked to formed the fuel cell stack 10, these supply and discharge holes form manifolds that supplies fuel gas, oxidizing gas, and cooling water to each fuel cell 100, and manifolds that discharge fuel gas, oxidizing gas, and cooling water from each fuel cell 100. Note that a sealing portion (not illustrated) is formed around the supply and discharge holes described above, respectively to secure sealing properties of the manifolds between the separators and between the separator and the current collector when the fuel cells 100 are stacked.

The constituent materials of the anode-side separator 120 and the cathode-side separator 130 may be other materials having a gas-shield property and an electron conduction property, without limiting to the materials in this embodiment. For example, the separators may be made of carbon materials, such as dense carbon which is fabricated by compressing carbon particles to give the material a gas impermeability, or may be made of metals, such as stainless steel, aluminum, or alloy of these metals. Note that it is preferred that these plate member are made of metal with a high corrosion resistance because they are exposed to the cooling water.

Note that in FIGS. 1 and 2, bus bars 50 to be connected with the terminal portions 163F and 163E for outputting the power generated in the fuel cell stack 10 are illustrated by dashed lines.

A2. Structure of Current Collector

As illustrated in FIG. 2, the current collector 160F includes a current collecting portion 161F for collecting the power generated in each fuel cell 100, and a terminal portion 163F for outputting outside the power collected by the current collecting portion 161F. In this embodiment, the current collecting portion 161F is a metal plate in which metal plates made of titanium are stacked onto both sides of a metal plate made of aluminum. A fuel gas supply hole 162IN and a fuel gas discharge hole 162OT, an oxidizing gas supply hole 164IN and oxidizing gas discharge holes 164OT, and a cooling water supply hole 166IN and a cooling water discharge hole 166OT are formed in a peripheral edge portion of the current collecting portion 161F. These supply and discharge holes are connected with corresponding supply and discharge holes of the end plate and the fuel cells when the plurality of fuel cells are stacked to form the fuel cell stack, thereby functioning as part of the manifolds for supplying and discharging reactive gas and cooling water to/from the fuel cells. The stacked body 12 which is formed by stacking the plurality of fuel cells 100 in this embodiment corresponds to a fuel cell in the claim 1.

Figure 3:
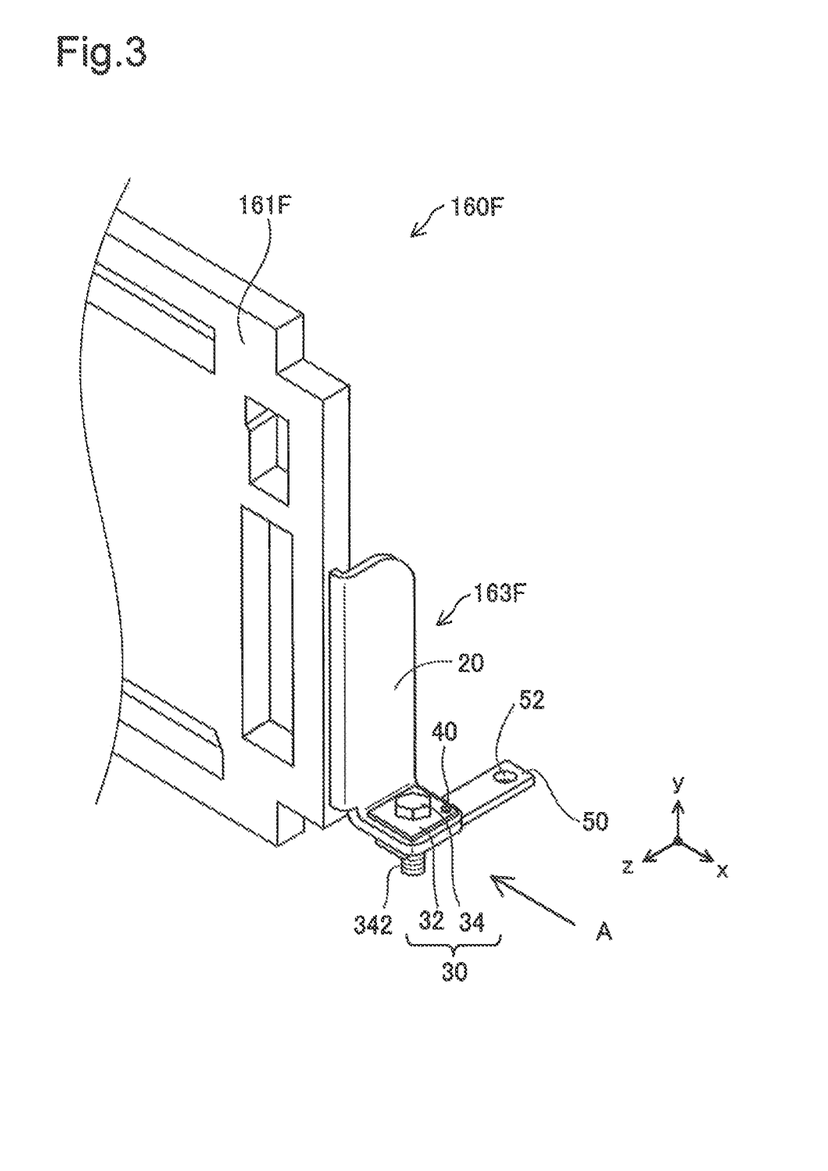
FIG. 3 is a partially enlarged perspective view of a terminal portion of the current collector as one embodiment of the present invention.
Figure 4:
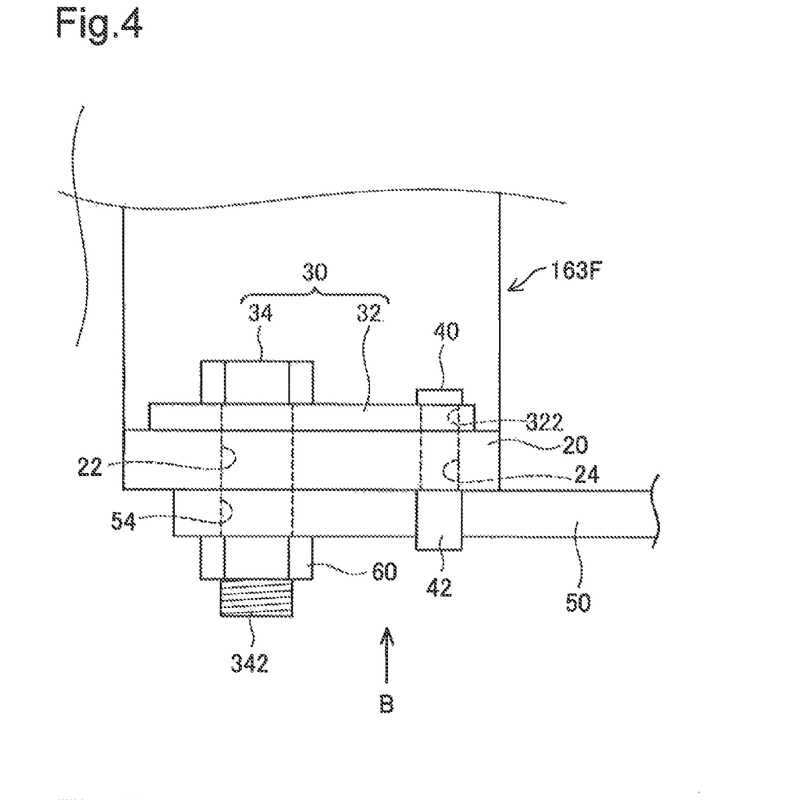
FIG. 4 is a side view schematically illustrating the terminal portion, viewed in a direction A of FIG. 3.
Figure 5:
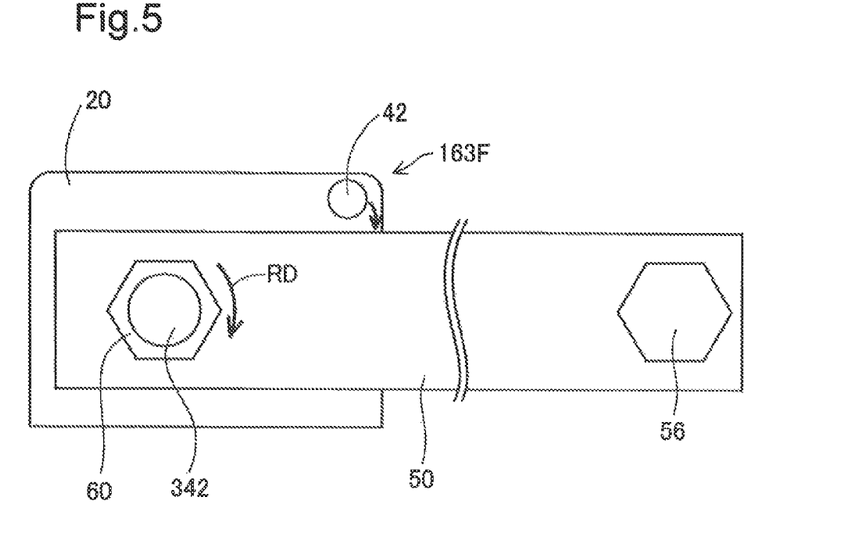
FIG. 5 is a plan view schematically illustrating of the terminal portion, viewed in a direction B of FIG. 4.

FIG. 3 is a partially enlarged perspective view of the terminal portion 163F of the current collector 160F as one embodiment of the present invention. FIG. 4 is a side view schematically illustrating the terminal portion 163F, viewed in a direction A of FIG. 3. FIG. 5 is a plan view schematically illustrating the terminal portion 163F, viewed in a direction B in FIG. 4. In FIGS. 3 to 5, one of the bus bars 50 connected with the terminal portion 163F is also illustrated. As illustrated in FIGS. 3 to 5, the terminal portion 163F includes a terminal portion main body 20, a male threaded member set 30, a rivet 40, and a nut 60. As illustrated in FIG. 3, the terminal portion main body 20 is formed integrally to one of the short sides of the current collecting portion 161F. The terminal portion main body 20 has a slightly protruding portion extending outward (x-direction) from the short side of the current collecting portion 161F, a rearwardly (negative in z-direction) extending portion which is formed by bending a tip end portion of the protruding portion at substantially 90°, rearwardly in the stacking direction (i.e., perpendicular to the plate surface of the current collecting portion 161F which is a surface in contact with the fuel cell 100 (FIG. 2) or the insulating plate 165F (FIG. 1)), and an outwardly (x-direction) extending portion which is extended from a lower end of the rearwardly extending portion in parallel with the long side (x-directions) of the current collecting portion 161. The terminal portion main body 20 is comprised of a metal plate made of aluminum, and is formed integrally with the metal plate made of aluminum which constitutes the current collecting portion 161F. The male threaded member set 30 is provided with a seat portion 32 and a bolt 34. A male-threaded stem portion 342 of the bolt 34 penetrates the seat portion 32, and the bolt 34 is then joined to the seat portion 32 by projection welding. Note that the bolt 34 may also be joined to the seat portion 32 by other welding techniques, such as spot welding, or other techniques. The seat portion 32 may also be made of other various metals, such as aluminum, titanium, and alloys of these metals, without being limited to stainless steel as illustrated in this embodiment.

As illustrated in FIG. 4, a through-hole 22 through which the stem portion 342 of the bolt 34 penetrates is formed in the terminal portion main body 20. Through-holes 322 and 24 through which the rivet 40 penetrates are formed at corresponding positions in the seat portion 32 of the male threaded member set 30, and the terminal portion main body 20, respectively. The stem portion 342 of the bolt 34 penetrates the through-hole 22 of the terminal portion main body 20, and the rivet 40 is inserted into the through-hole 322 of the seat portion 32 and the through-hole 24 of the terminal portion main body 20. A tip end portion of the rivet 40 is then given a pressure to be bucked or deformed to attach the male threaded member set 30 to the terminal portion main body 20. In this embodiment the tip end portion of the rivet 40 is deformed by pressure so that the deformed tip end portion projects from the terminal portion main body 20 by a predetermined length, and forms a protruded portion 42 in a surface where the bolt 34 of the terminal portion main body 20 projects.

As illustrated in FIG. 5, when the bus bar 50 is attached to the terminal portion 163F, the protruded portion 42 is disposed rearward in a fastening rotational direction RD of the nut 60 with respect to the bus bar 50, and is disposed inward in a longitudinal direction of the bus bar 50 with respect to the stem portion 342. The phrase "disposed inward in a longitudinal direction of the bus bar 50 with respect to the stem portion 342" refers to the protruded portion 42 being disposed at a predetermined distance from (the center of) the stem portion 342 that includes a rotational axis of the bus bar 50 when the nut 60 is tightened. In other words, the protruded portion 42 is disposed on the opposite side from the end of the bus bar 50 that is attached to the terminal portion 163F with respect to the rotational axis. The stem portion 342 in this embodiment corresponds to a first threaded part in the claims, the nut 60 in this embodiment corresponds to a second threaded part in the claims, the male threaded member set 30 in this embodiment corresponds to a threaded member set in the claims, and the rivet 40 in this embodiment corresponds to an attaching member in the claims.

Although the current collector 160E on the rear end side is different from the current collector 160F on the front end side in the existence of supply and discharge holes as described above, other structures are substantially the same. That is, the current collector 160E is provided with a current collecting portion 161E and a terminal portion 163E, similar to the current collector 160F. The terminal portion 163E has a similar structure to the terminal portion 163F of the current collector 160F. Therefore, the terminal portion 163F and the terminal portion 163E are collectively referred to as a terminal portion 163 unless otherwise they are necessary to be distinguished from each other.

A3. Fuel Cell System

Figure 6:
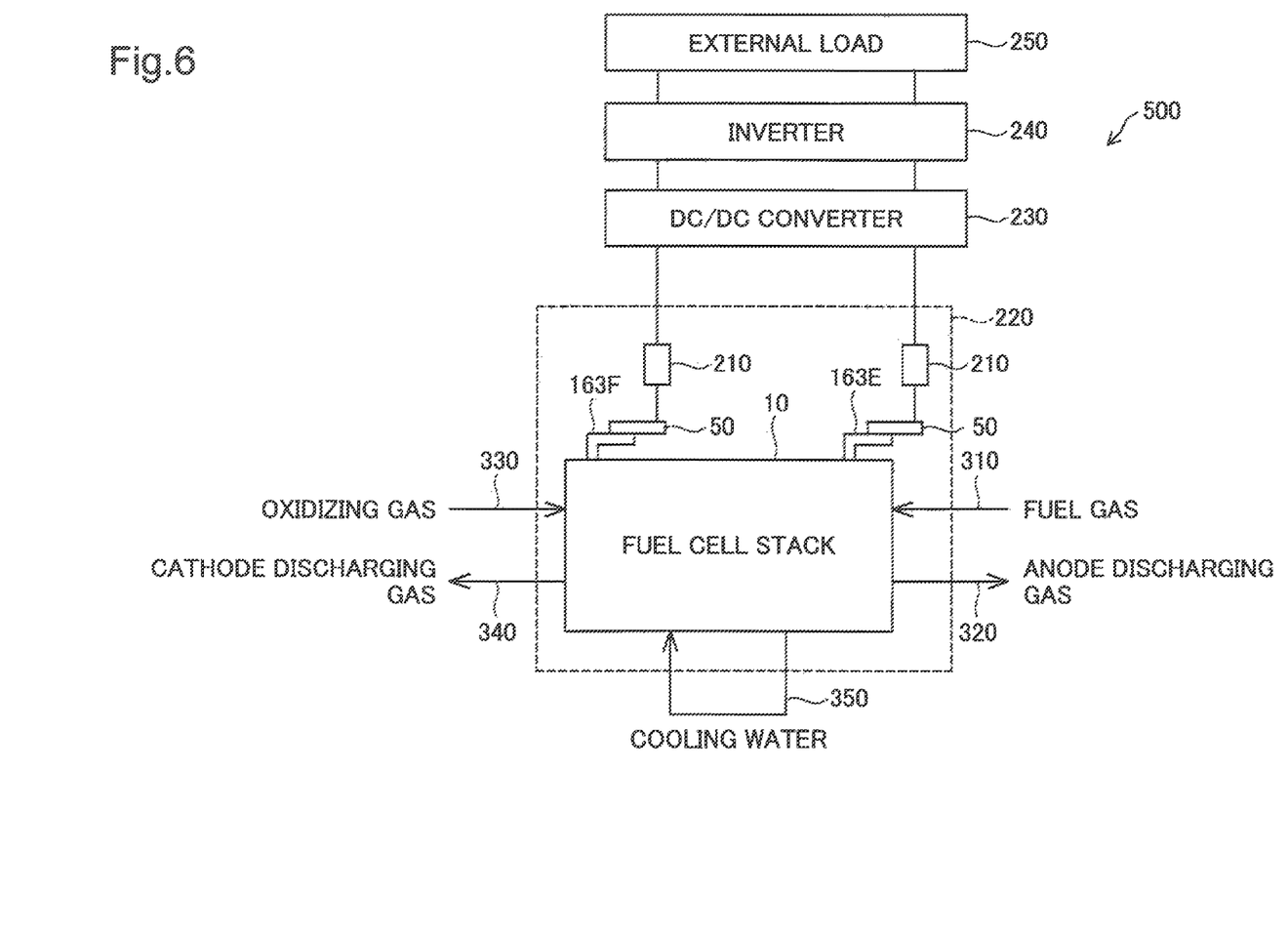
FIG. 6 is a view schematically illustrating a structure of a fuel cell system of one embodiment of the present invention.

FIG. 6 is a view schematically illustrating a structure of a fuel cell system of one embodiment of the present invention. As illustrated, the fuel cell system 500 primarily includes a fuel gas supply system 310, an anode discharging gas discharge system 320, an oxidizing gas supply system 330, a cathode discharging gas discharge system 340, a cooling water circulatory system 350, relays 210, a fuel cell stack case 220, a DC-DC converter 230, an inverter 240, and an external load 250, in addition to the fuel cell stack 10 and the bus bars 50 described above. Although the fuel gas supply system 310, the anode discharging gas discharge system 320, the oxidizing gas supply system 330, the cathode discharging gas discharge system 340, and the cooling water circulatory system 350 includes a pump, supply and discharge valves, etc., respectively, the illustration thereof is herein omitted. As illustrated in FIG. 6, power generated in the fuel cell stack 10 is outputted to the DC-DC converter 230 via the relays 210 to be converted into direct-current (DC) power according to a demand for the external load 250, and the DC power is then converted into alternate-current (AC) power by the inverter 240 to be supplied to the external load 250. In this embodiment, the fuel cell stack 10 and the relays 210 are accommodated in the fuel cell stack case 220, and the fuel cell stack 10 and each relay 210 are mutually connected via the bus bar 50. The relay 210 in this embodiment corresponds to an instrument in the claims.

Figure 7:
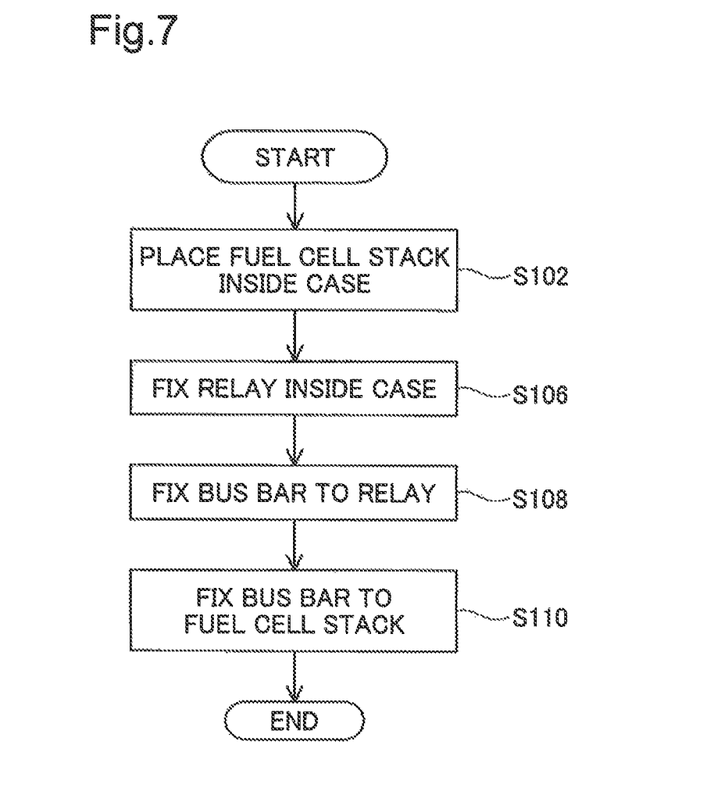
FIG. 7 is flowchart illustrating a part of method of manufacturing the fuel cell system.

FIG. 7 is flowchart illustrating a part of method of manufacturing the fuel cell system 500. FIG. 7 illustrates a process to attach each relay 210 to the fuel cell stack 10. The fuel cell stack 10 is first placed inside the fuel cell stack case 220 (step S102). The relay 210 is then attached to a part inside the fuel cell stack case 220 (step S106). The bus bar 50 is selected from a group of the bus bars having different lengths according to a distance between the terminal portion 163 of the fuel cell stack 10 and the relay 210, and the selected bus bar 50 is then fixed to the relay 210 (step S108). Here, one of through-holes 54 (FIG. 4) formed at ends of the bus bar 50 is hooked on the stem portion 342 of the terminal portion 163, and the other through-hole 52 (FIG. 3) is aligned with a through-hole in a connection terminal on the relay 210 side, and the bus bar 50 is fixed with a bolt 56 (FIG. 5) and a nut (not illustrated). Since the relay 210 is fixed to the fuel cell stack case 220 at step S106, the end portion of the bus bar 50 on the through-hole 52 side is fixed at step S108. Then, the nut 60 is threadedly engaged with the stem portion 342 to fix the bus bar 50 to the terminal portion 163 of the fuel cell stack 10 (step S110).

A4. Effects of First Embodiment

The current collector 160 of the first embodiment includes the terminal portion 163 for outputting the collected power, and the terminal portion 163 includes the stem portion 342 on which a male thread is formed, and the protruded portion 42 formed in the same surface as the stem portion 342. The fuel cell stack 10 of this embodiment includes the current collectors 160. The fuel cell system 500 of this embodiment includes the fuel cell stack 10, and the relays 210 are attached to the fuel cell stack 10 according to the process described above. As illustrated in FIG. 5, when fixing the bus bar 50 by tightening the nut 60, an excessive torque accompanying when the tightening of the nut 60 acts on the terminal portion main body 20 of the terminal portion 163 (in the arrow direction RD of FIG. 5) if the nut 60 is further rotated in the tightening direction after the nut 60 is tightened at a predetermined suitable torque. Since the terminal portion 163 includes the protruded portion 42, the protruded portion 42 contacts the bus bar 50 which is fixed at the other end even if the excessive torque acts on the terminal portion main body 20 as illustrated in FIG. 5, thereby reducing the rotation (deformation) of the terminal portion main body 20. As a result, an increase in the electric resistance due to the poor contact between the terminal portion main body 20 and the bus bar 50 is suppressed, thereby suppressing a reduction in the retrieving efficiency of power generated by the fuel cell stack 10.

Further, in the current collector 160 of this embodiment, the male threaded member set 30 where the bolt 34 is joined to the seat portion 32 is fixed to the terminal portion main body 20 with the rivet 40. Therefore, compared with a case where the bolt 34 is directly joined to the terminal portion main body 20 by welding etc., the deformation of the terminal portion main body 20 is reduced and, thus, the poor contact with the bus bar 50 can be reduced.

Further, when applying pressure to deform the tip end of the rivet 40 which fixes the male threaded member set 30 to the terminal portion main body 20, the tip end of the rivet 40 can be used as the protruded portion 42 which serves as a turning stopper for the terminal portion main body 20 because a portion of the rivet 40 which projects from the terminal portion main body 20 is slightly lengthened. Therefore, as compared with a case where another protruded portion is provided as the turning stopper of the terminal portion main body 20, the number of components can be reduced, thereby reducing the cost.

B. Second Embodiment

Figure 8:
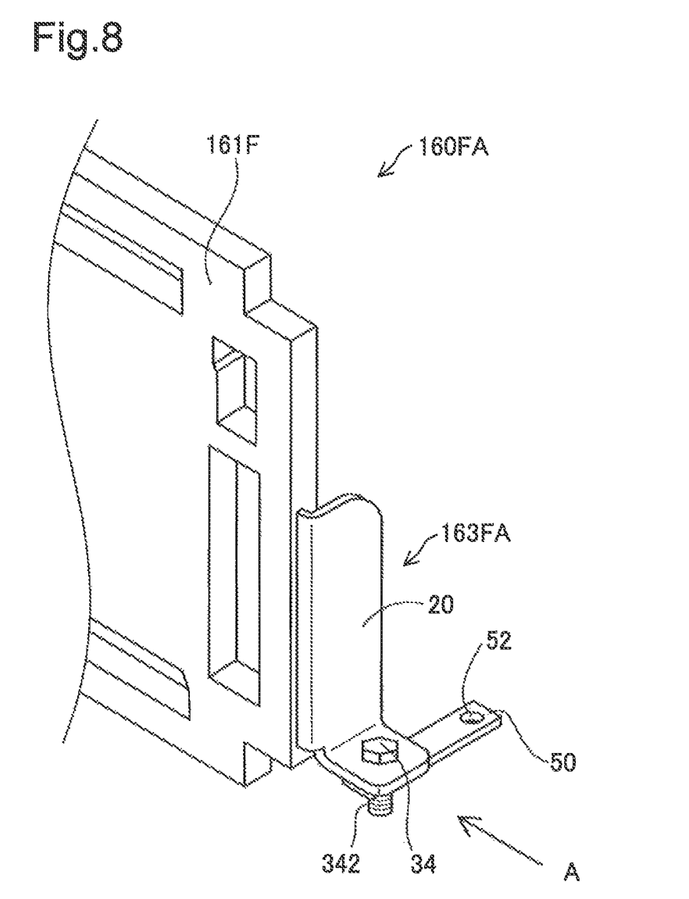
FIG. 8 is a partially enlarged perspective view of a terminal portion of a current collector of a second embodiment.
Figure 9:
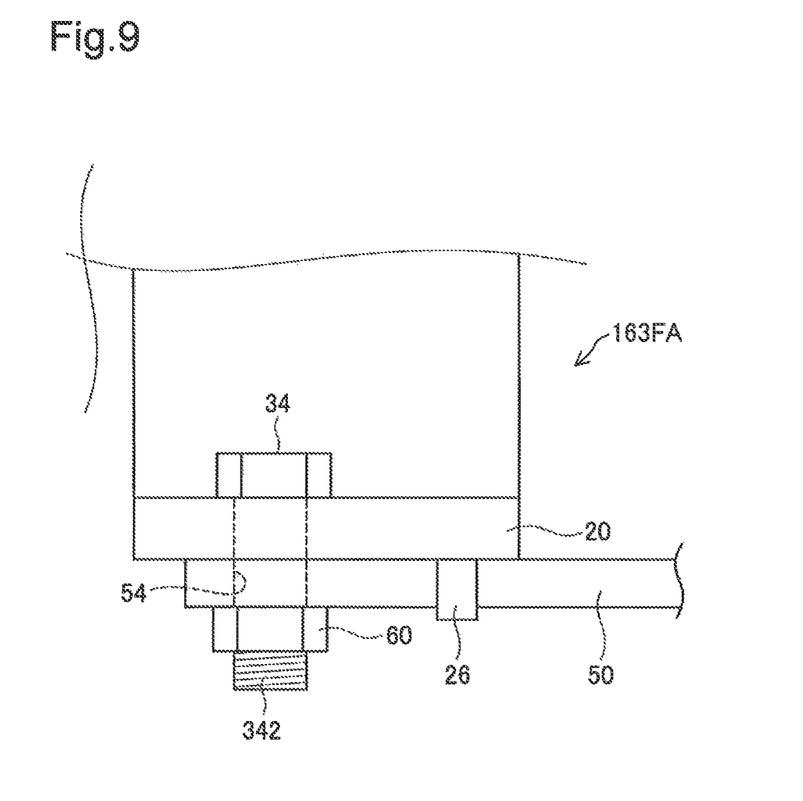
FIG. 9 is a side view schematically illustrating the terminal portion of the second embodiment, viewed in a direction A of FIG. 8.

FIG. 8 is a partially enlarged perspective view of a terminal portion of a current collector 160FA of a second embodiment. In FIG. 8, the current collector 160FA is illustrated as one disposed on the front end side. FIG. 9 is a side view schematically illustrating the terminal portion 163FA, viewed in a direction A of FIG. 8. Although the current collector 160FA of the second embodiment differs in a structure of the terminal portion 163FA from the terminal portion 163F of the first embodiment, other structures are the same and, thus the same components are denoted with the same reference numerals and the description thereof is omitted in this embodiment. As illustrated in FIG. 8, the current collector 160FA includes a current collecting portion 161F and the terminal portion 163FA. As illustrated in FIGS. 8 and 9, the terminal portion 163FA includes the terminal portion main body 20, the bolt 34, a protruded portion 26, and the nut 60. Unlike the first embodiment, the bolt 34 is directly joined to the terminal portion main body 20 by projection welding, in the current collector 160FA of this embodiment. The protruded portion 26 is formed in a substantially circular pillar or solid cylindrical shape made of aluminum, and is joined by projection welding to the surface of the terminal portion main body 20 where the stem portion 342 of the bolt 34 projects. The protruded portion 26 is formed at a position corresponding to the protruded portion 42 in the first embodiment. The same structure of the terminal portion can also be applied to the current collector on the rear end side.

The terminal portion 163FA of the current collector 160FA of this embodiment includes the stem portion 342 on which a male thread is formed, and the protruded portion 26 in the same surface as the stem portion 342. Therefore, similar to the first embodiment, when the nut 60 is tightened to fix the bus bar 50, the protruded portion 26 contacts the bus bar 50 even if the excessive torque accompanying the tightening of the nut 60 acts on the terminal portion main body 20, thereby reducing the rotation (deformation) of the terminal portion main body 20. If the fuel cell system is comprised of the fuel cell stack having the current collector 160FA of this embodiment, the increase in the electric resistance due to the poor contact between the terminal portion main body 20 and the bus bar 50 is suppressed, thereby reducing the retrieving efficiency of power generated by the fuel cell stack.

C. Modification

The present invention is not limited to the embodiments described above, and can be achieved in various forms without departing from the scope of the invention. For example, technical features in the embodiments corresponding to technical features of each aspect cited in the section of "SUMMARY OF THE INVENTION," can suitably be substituted and/or combined in order to partially or entirely solve the subject described above, or in order to obtain some or all of the effects described above. The technical features can suitably be deleted if they are not described as essential matters in this specification. For example, the following modifications may be possible.

(1) In the embodiments described above, although an example in which the male threaded portion is formed in the terminal portion 163 by using the bolt 34 is illustrated, the method of forming the male threaded portion is not limited to the embodiments described above. For example, a rod on which a male thread is formed may be joined to the terminal portion main body 20 by welding etc. Further, in the embodiments described above, although an example in which the terminal portion main body 20 is integrally formed with the metal plate made of aluminum which constitutes the current collecting portion 161 is illustrated, the terminal portion main body 20 and the metal plate may be provided separately, and may be joined later. The terminal portion main body 20 should be electrically connected with the current collecting portion 161. The terminal portion main body 20 and the male threaded portion may be formed integrally by casting.

(2) In the embodiments described above, although an example in which the protruded portion is disposed rearward in the fastening rotational direction of the nut 60 with respect to the bus bar 50, and is disposed inward in the longitudinal direction of the bus bar 50 with respect to the stem portion 342 is illustrated, the location of the protruded portion is not limited to the embodiment described above, but should be any location where the protruded portion can contact the bus bar 50 to stop the rotation of the terminal portion main body 20 due to the fastening torque of the nut 60. For example, the protruded portion may be disposed rearward in the fastening rotational direction of the nut 60 with respect to the bus bar 50 but may be disposed outward in the longitudinal direction of the bus bar 50 with respect to the stem portion 342. The shape of the protruded portion is not limited to the embodiment described above. For example, an end of the terminal portion main body 20 may be bent to form the protruded portion. The protruded portion may also be formed by punching or embossing.

(3) The materials that form the current collector are not limited to the embodiments described above. For example, other metals, such as gold, silver, and copper, may be used for one part of the current collector made of aluminum. Note that aluminum is preferred in terms of reductions in cost and weight. Other metals having a high corrosion resistance may be used for the other part of the current collector made of titanium. Further, in the embodiments described above, although the metal plate having a stacked structure of three metal plates of two different materials is illustrated, the current collecting portion of the current collector may be formed with one kind of metal without being limited to the structure in the embodiments described above. Alternatively, three or more kinds of metals, or three or more sheets of metal plates may be used to form the current collector.

Figure 10:
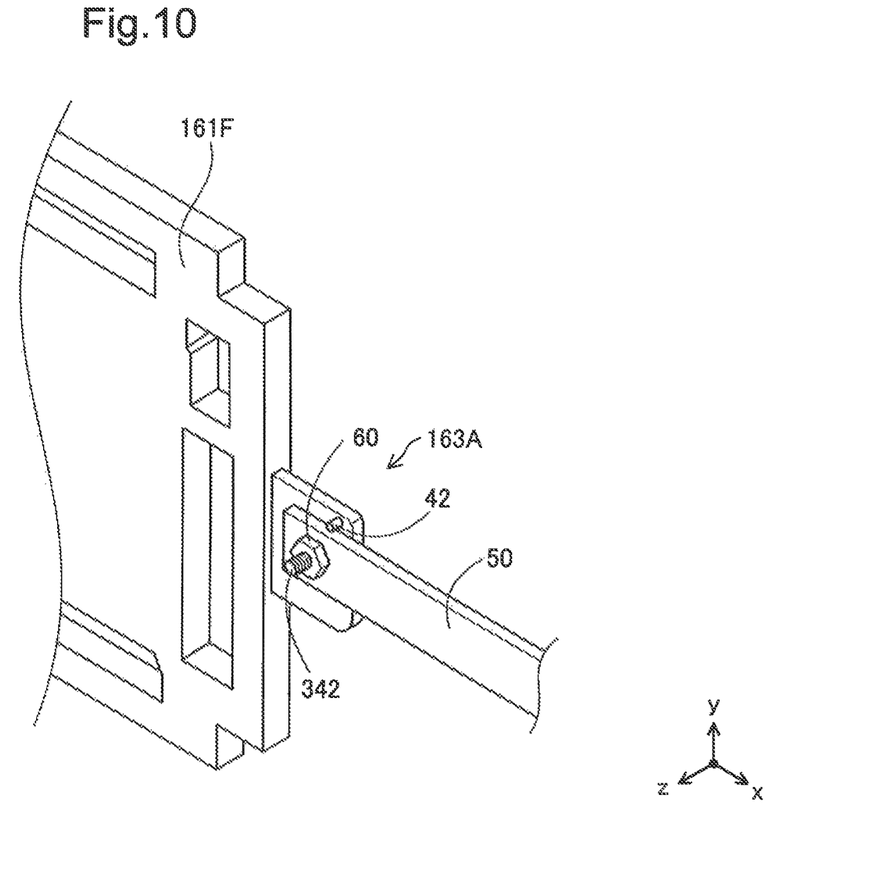
FIG. 10 is a perspective view schematically illustrating a terminal portion 163A of Modification 1.
Figure 11:
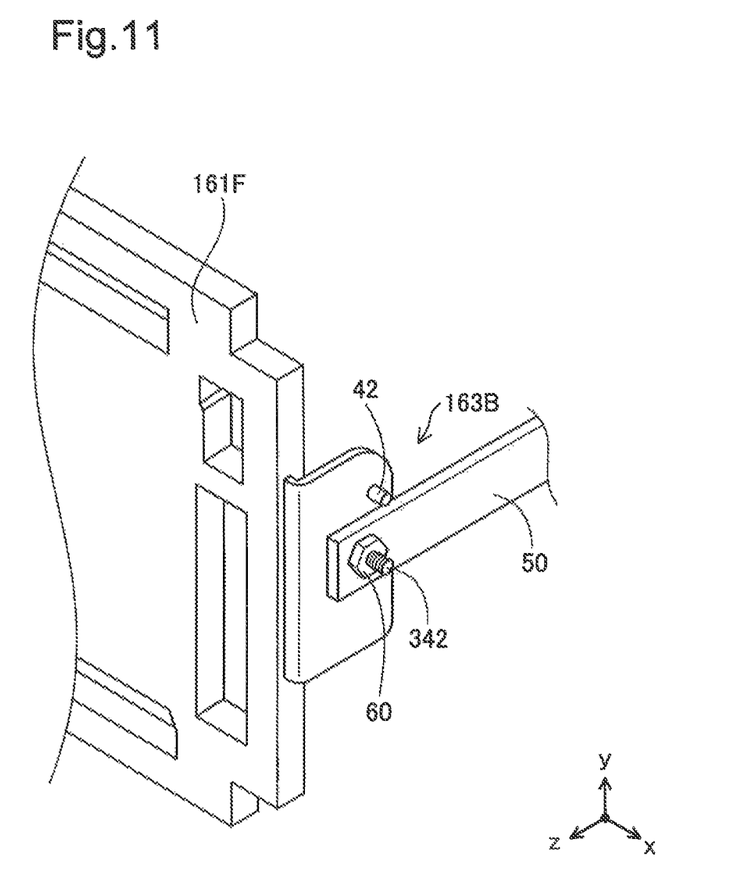
FIG. 11 is a perspective view schematically illustrating a terminal portion 163B of Modification 2.

(4) The shape of the terminal portion 163 is not limited to the embodiments described above. For example, the terminal portion 163 may be formed in the shapes as illustrated Modifications 1 and 2. FIG. 10 is a perspective view schematically illustrating a terminal portion 163A of Modification 1, and FIG. 11 is a perspective view schematically illustrating a terminal portion 163B of Modification 2. As illustrated in FIG. 10, the terminal portion 163A of Modification 1 is formed parallel to xy plane, i.e., parallel to the plate surface of the current collecting portion 161. As illustrated in FIG. 11, the terminal portion 163B of Modification 2 is provided so as to be bent substantially at right angle with respect to the plate surface of the current collecting portion 161, and to extend in the stacking directions (z-directions), similar to the terminal portion 163F in FIG. 3. Thus, the shape of the terminal portion 163 may suitably be designed according to the installation space etc. of the fuel cell stack.

(5) In the embodiments described above, although an example in which the bolt (male-threaded member) is fixed to the terminal portion main body 20 is illustrated, a nut (female-threaded member) may be fixed to the terminal portion main body 20. The rotation (deformation) of the terminal portion main body 20 can also be reduced with the nut (female-threaded member) when the excessive torque accompanying the rotation of the bolt acts on the terminal portion main body 20.

What is claimed is:

1. A current collector for a fuel cell, comprising a current collecting portion configured to collect electric power generated by the fuel cell, and a terminal portion, to which a bus bar being attached, for outputting the power collected by the current collecting portion, wherein,
    the terminal portion includes:
        a terminal portion main body, electrically connected with the current collecting portion;
        a first threaded part fixed to the terminal portion main body;
        a second threaded part for threadedly engaging with the first threaded part to fix one end of the bus bar to the terminal portion; and
        a protruded portion provided in the same surface as a surface where the first threaded part of the terminal portion main body is provided, and
    the protruded portion is disposed at a position where the protruded portion contacts the bus bar to stop a rotation of the terminal portion main body accompanying fastening of the second threaded part, when the one end of the bus bar is fixed to the terminal portion in a state where the other end of the bus bar is fixed to an instrument that is not the current collector.

2. The current collector in accordance with claim 1, wherein the terminal portion main body includes a tip end side, and the protruded portion is disposed inward in a longitudinal direction of the bus bar with respect to the center of the first threaded part and on the tip end side of the terminal portion main body, when the one end of the bus bar is fixed to the terminal portion and the other end of the bus bar is fixed to the instrument.

3. The current collector in accordance with claim 1, further comprising:
    a threaded member set having a seat portion, the first threaded part being formed in the seat portion; and
    an attaching member for attaching the seat portion to the terminal portion main body, the attaching member being the protruded portion.

4. The current collector in accordance with claim 3, wherein the attaching member is a rivet.

5. The current collector in accordance with claim 1, wherein the first threaded part is a bolt, and the second threaded part is a nut.

6. A fuel cell stack, comprising:
    a stacked body where a plurality of fuel cells are stacked; and
    the current collectors in accordance with claim 1.

7. A fuel cell system, comprising:
    the fuel cell stack in accordance with claim 6;
    the bus bars fixed to the current collectors of the fuel cell stack at one end thereof; and
    the instrument fixed to the other end of the bus bar.

8. A method of manufacturing a fuel cell system in accordance with claim 7, comprising:
    (A) disposing the fuel cell stack at a predetermined position;
    (B) fixing the instrument at a predetermined position;
    (C) fixing the bus bars to the fixed instrument; and
    (D) fixing the bus bar fixed to the instrument, to the terminal portion of the current collector of the fuel cell stack.

* * * * *